(12) United States Patent
Pashenkov et al.

(10) Patent No.: US 7,823,153 B1
(45) Date of Patent: Oct. 26, 2010

(54) SYSTEM AND METHOD FOR DETECTING AND LOGGING IN-LINE SYNCHRONIZATION PRIMITIVES IN APPLICATION PROGRAM CODE

(75) Inventors: Serge Pashenkov, Redwood City, CA (US); Serge Shats, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 1426 days.

(21) Appl. No.: 11/240,966

(22) Filed: Sep. 30, 2005

(51) Int. Cl.
*G06F 9/46* (2006.01)
*G06F 9/45* (2006.01)
*G06F 11/00* (2006.01)

(52) U.S. Cl. .................... 718/100; 714/6; 714/13; 714/15; 717/148

(58) Field of Classification Search .......... 718/104, 718/100; 714/6, 13, 15; 717/148
See application file for complete search history.

(56) References Cited

U.S. PATENT DOCUMENTS

| | | | |
|---|---|---|---|
| 4,718,008 A | 1/1988 | Chang | |
| 4,868,738 A | 9/1989 | Kish | |
| 5,280,611 A | 1/1994 | Mohan | |
| 5,282,274 A | 1/1994 | Liu | |
| 5,740,440 A | 4/1998 | West | |
| 5,802,585 A | 9/1998 | Scales | |
| 6,014,513 A | 1/2000 | Voelker | |
| 6,101,524 A | 8/2000 | Choi | |
| 6,243,793 B1 | 6/2001 | Aucsmith | |
| 6,408,305 B1 | 6/2002 | Stoodley | |
| 6,625,635 B1 | 9/2003 | Elnozahy | |
| 6,728,950 B2 | 4/2004 | Davis | |
| 6,820,218 B1 | 11/2004 | Barga | |
| 6,832,367 B1 | 12/2004 | Choi | |
| 6,848,106 B1 | 1/2005 | Hipp | |
| 6,850,945 B2 | 2/2005 | Lanzatella | |
| 6,854,108 B1 | 2/2005 | Choi | |
| 7,093,162 B2 | 8/2006 | Barga | |
| 7,251,745 B2 | 7/2007 | Koch | |
| 2002/0087843 A1 | 7/2002 | Kottapalli | |
| 2002/0133675 A1 | 9/2002 | Hirayama | |
| 2003/0212983 A1 | 11/2003 | Tinker | |
| 2004/0221272 A1 | 11/2004 | Wu | |
| 2004/0255182 A1 | 12/2004 | Lomet | |
| 2006/0026387 A1 | 2/2006 | Dinechin | |
| 2006/0150183 A1 | 7/2006 | Chinya et al. | |

OTHER PUBLICATIONS

U.S. Appl. No. 11/321,458, entitled "System and Method for Deterministic Operation and Playback of Binary Applications with Inline Latches and Spinlocks", filed Dec. 29, 2005.

(Continued)

*Primary Examiner*—Meng-Ai An
*Assistant Examiner*—Eric C Wai
(74) *Attorney, Agent, or Firm*—Meyertons, Hood, Kivlin, Kowert & Goetzel, P.C.

(57) ABSTRACT

A system, method, and computer-accessible medium for detecting and logging in-line synchronization primitives are disclosed. One or more in-line synchronization primitives in a computer program are programmatically detected during execution of the computer program. The one or more in-line synchronization primitives are stored in a log.

7 Claims, 7 Drawing Sheets

OTHER PUBLICATIONS

U.S. Appl. No. 11/324,457, entitled "System and Method for Logging and Replaying Accesses to Shared Memory", filed Dec. 29, 2005.

U.S. Appl. No. 11/321,460, entitled "System and Method for Detecting In-Line Synchronization Primitives in Binary Applications," filed Dec. 29, 2005.

Netzer: "Optimal Tracing and Replay for Debugging Shared-Memory Parallel Programs;" Workshop on Parallel & Distributed Debugging; Proceedings of the 1993 ACM/ONR Workshop on Parallel and Distributed Debugging; San Diego, California, pp. 1-11; 1993; ISBN:0-89791-633-6.

Ronsse, et al., "RecPlay: a Fully Integrated Practical Record/Replay System," ACM Transactions on Computer Systems, vol. 17, No. 2, pp. 133-152, May 1999.

SYSTEM AND METHOD FOR DETECTING AND LOGGING IN-LINE SYNCHRONIZATION PRIMITIVES IN APPLICATION PROGRAM CODE

BACKGROUND

1. Field of the Invention

This invention relates to enterprise system management and, more particularly, to continuous availability techniques in multi-server networked environments.

2. Description of the Related Art

The impact of system downtime on productivity is increasing as organizations rely more heavily on information technology. Consequently, organizations may seem to minimize downtime through various approaches designed to increase reliability and availability. Ultimately, the goal of many organizations is to ensure the continuous availability of critical systems.

One approach to continuous availability is the use of redundant hardware executing redundant instances of an application in lockstep. If one instance of an application on one unit of hardware fails, then the instance on the other unit of hardware may continue to operate. However, the redundant hardware is often proprietary, and both the redundant and proprietary natures of the hardware yield a cost that may be prohibitive.

To avoid the expense of special-purpose hardware, software techniques may be used to provide failover of an application. For example, cluster management software may support application failover in a networked environment having two or more servers and a shared storage device. If the failure of an application or its host server is sensed, then a new instance of the application may be started on a functioning server in the cluster. However, software-based failover approaches may fail to preserve the entire context of the application instance on the failed server up to the moment of failure. In the wake of a failure, the new instance of the application is typically started anew. In the process, recent transactions and events may be discarded. Other transactions and events may be left in an indeterminate state.

It is desirable to provide improved methods and systems for continuously available execution environments.

SUMMARY

A system, method, and computer-accessible medium for detecting and logging in-line synchronization primitives are disclosed. The method may include programmatically detecting one or more in-line synchronization primitives in a computer program during execution of the computer program. The in-line synchronization primitives may be detected using dynamic binary compilation at runtime. Using dynamic binary compilation, each in-line synchronization primitive may be replaced by or redirected to a substitute synchronization primitive which is visible to the operating system.

The method may further include storing the in-line synchronization primitives in a log. Upon execution of a substitute synchronization primitive in a manner visible to the operating system, the substitute synchronization primitive may be recognized by the operating system and logged accordingly. Any time a synchronization primitive is encountered in the computer program, it may be logged in the same order (with respect to other logged events) and with the same result as encountered during execution.

In one embodiment, execution of the computer program may be deterministically replayed using the log of synchronization primitives. Synchronization primitives in the log may be replayed in the same order and with the same results as originally encountered. In this manner, the state of the computer program at or immediately preceding the point of failure may be restored, and execution of the computer program may continue from the point of failure in a manner transparent to any clients.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
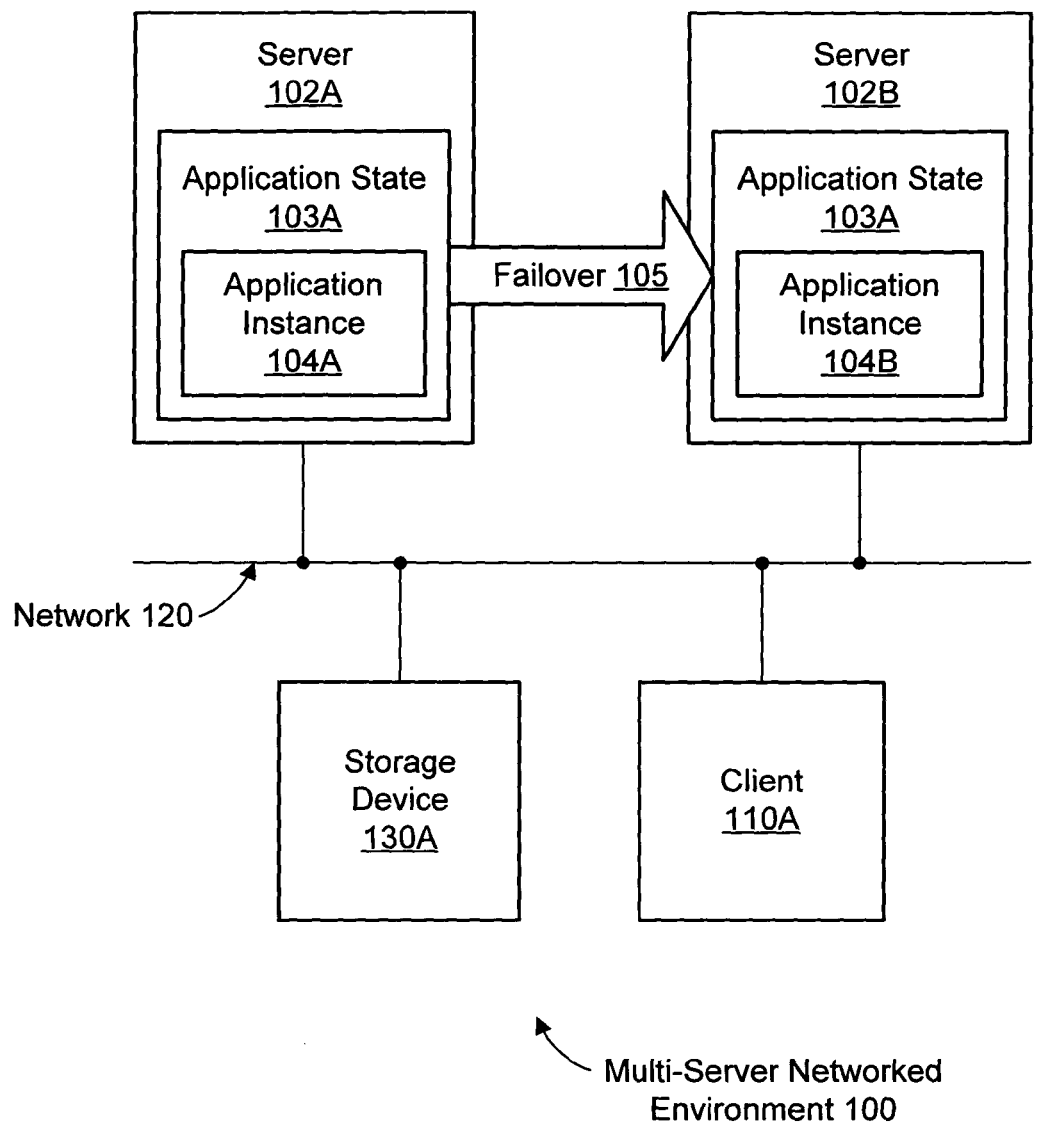
FIG. 1 illustrates a multi-server networked environment including failover according to one embodiment.
Figure 2:
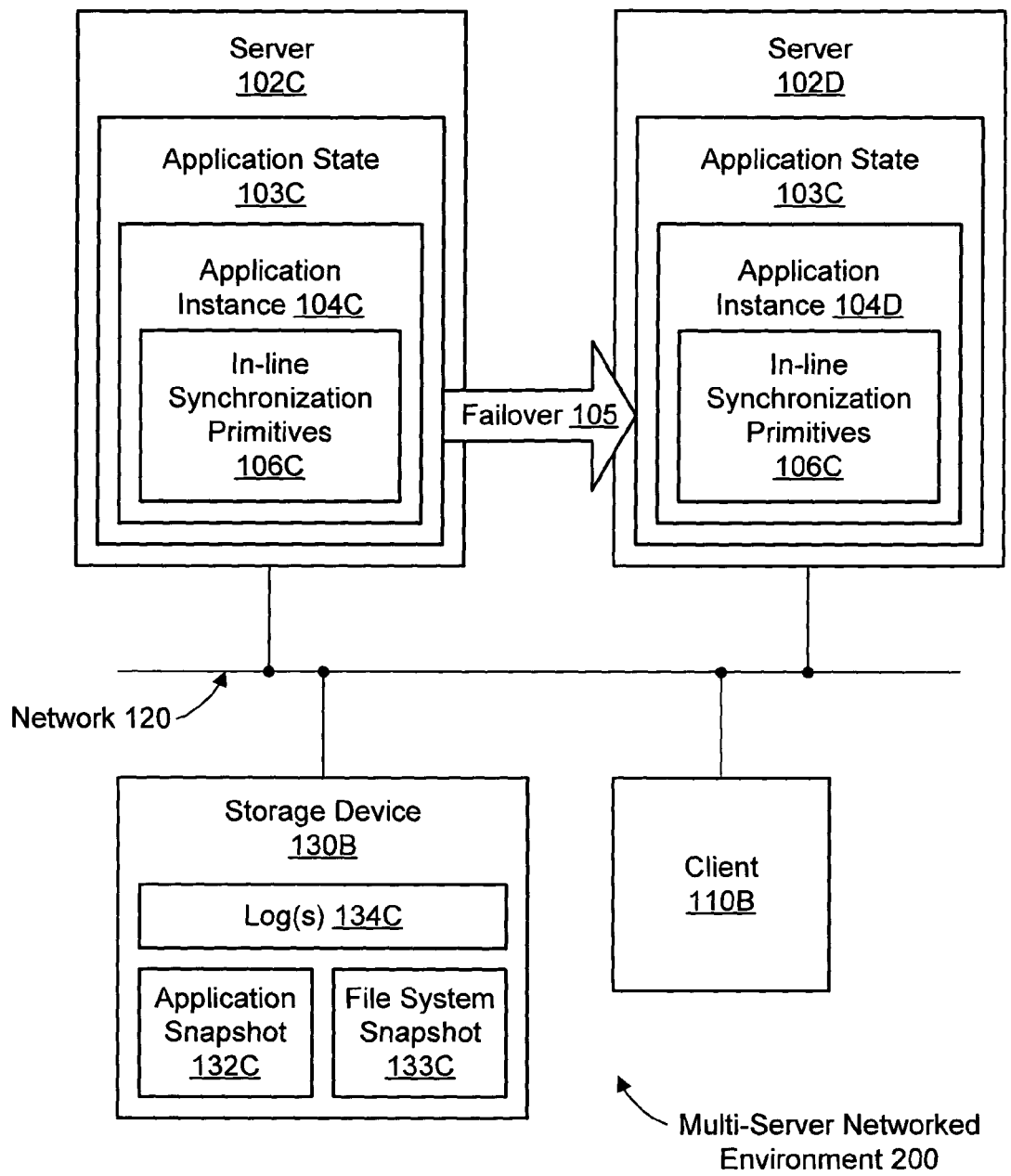
FIG. 2 illustrates a multi-server networked environment including detection, interception, and/or capture of in-line synchronization primitives according to one embodiment.
Figure 4:
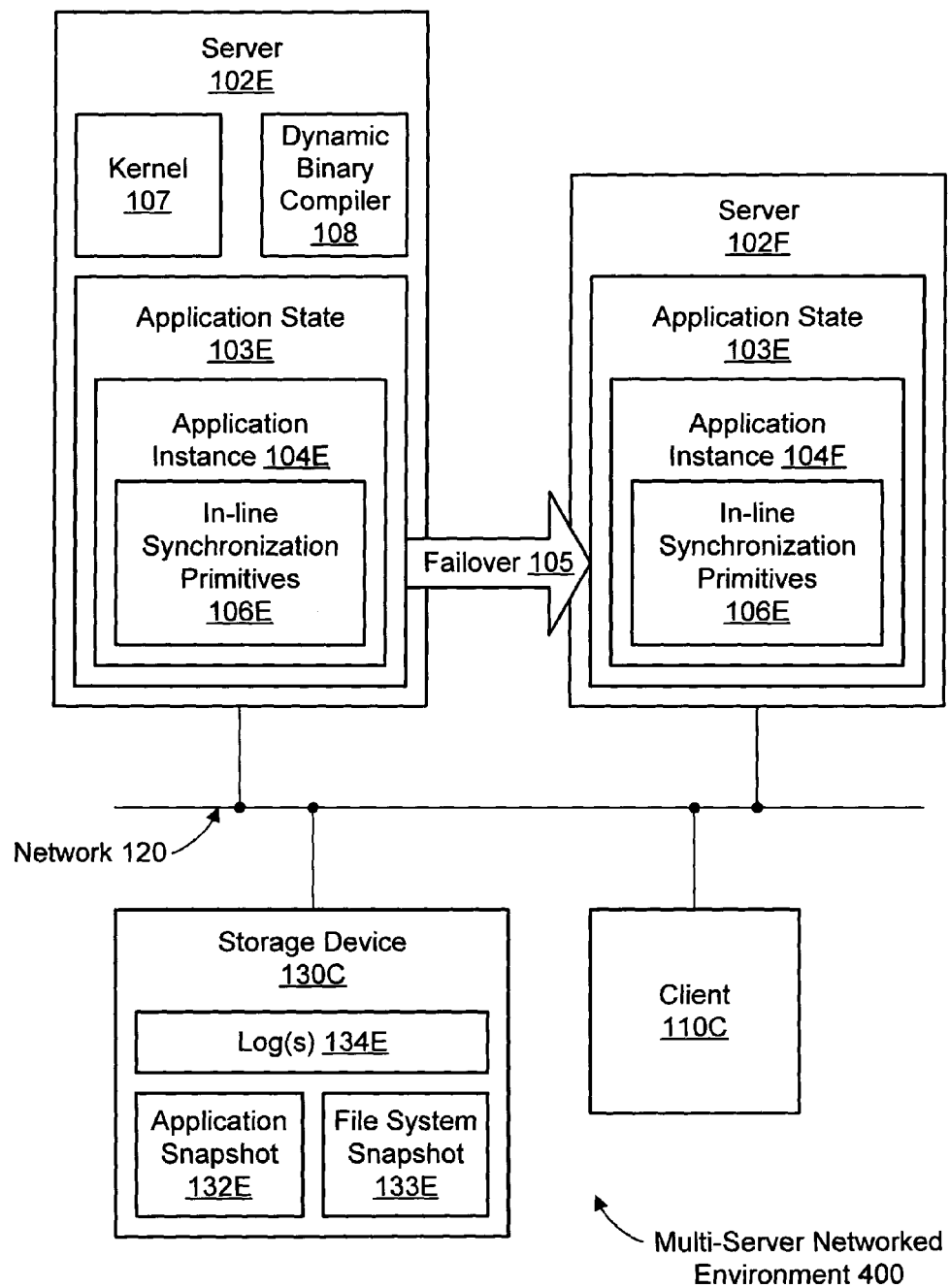
FIG. 4 illustrates a multi-server networked environment including detection, interception, and/or capture of in-line synchronization primitives using dynamic binary compilation according to one embodiment.

Using the systems, methods, and computer-accessible media described herein, detection, interception, and/or capture of in-line synchronization primitives may be provided. The detection, interception, and/or capture of in-line synchronization primitives may be used to preserve and duplicate application context in a continuously available execution environment. FIGS. 1, 2, and 4 illustrate examples of multi-server networked environments which may be used with the systems, methods, and computer-accessible media described herein. The example configurations shown in FIGS. 1, 2, and 4, and the quantity and kind of elements shown therein, are intended to be illustrative rather than limiting, and other embodiments are possible and contemplated.

As used herein, the term "server(s)" or "servers(s) 102" may refer collectively to any of the hosts 102A-102F illustrated in FIGS. 1, 2, and 4. Servers 102 may also be referred to herein as "hosts." As used herein, the term "client(s)" or "client(s) 110" may refer collectively to any of the clients 110A-110C illustrated in FIGS. 1, 2, and 4. As used herein, the term "storage device(s)" or "storage device(s) 130" may refer collectively to any of the storage devices 130A-130C illustrated in FIGS. 1, 2, and 4. As used herein, the term "application(s)" or "application(s) 104" may refer collectively to any of the application instances 104A-104F illustrated in FIGS. 1, 2, and 4. As used herein, the term "application state(s)" or "application state(s) 103" may refer collectively to any of the application instances 103A-103E illustrated in FIGS. 1, 2, and 4. As used herein, the term "multi-server networked environment(s)" may refer collectively to any of the multi-server networked environments 100, 200, 400 illustrated in FIGS. 1, 2, and 4.

FIG. 1 illustrates a multi-server networked environment 100 including failover according to one embodiment. The multi-server networked environment 100 may be used to provide a continuously available execution environment including failover 105 for one or more applications 104. If one server 102A fails, the execution environment may be recreated on another server 102B such that the application state 103A immediately prior to the failure is duplicated. The application state 103A may include execution state, memory state, transaction state, open network connections, open files, and any other parameters and context necessary to resume execution of the application 104 in a deterministic manner. By duplicating the application state 103A of one application instance 104A to another application instance 104B using failover techniques 105, the application 104 may continue execution in a manner that is transparent to one or more clients 110.

The continuously available execution environment may also be referred to as "software fault tolerance" or "application virtualization." In one embodiment, the continuously available execution environment may be implemented in software, i.e., without using redundant propriety hardware executing in lockstep. In one embodiment, the continuously available execution environment may be implemented without recompilation of an operating system kernel. In one embodiment, the continuously available execution environment may be implemented without static recompilation of applications 104. In one embodiment, the continuously available execution environment may be implemented without modification of clients 110, and the failover 105 may be transparent to clients 110. The continuously available execution environment may also be used for migration of applications 104 from server to server for maintenance or performance reasons.

In the example shown in FIG. 1, the multi-server networked environment 100 includes a storage device 130A coupled to a network 120. Various embodiments of the multi-server networked environments discussed herein may include various quantities and types of storage devices. Storage devices may include any of various types of storage devices including, but not limited to, storage systems such as RAID (Redundant Array of Independent Disks) systems, disk arrays, JBODs (Just a Bunch Of Disks, used to refer to disks that are not configured according to RAID), and other suitable storage devices.

In various embodiments, the network 120 may comprise any local area network (LAN) such as an intranet or any wide area network (WAN) such as the Internet. The network 120 may use a variety of wired or wireless connection media. Wired connection media may include, for example, Ethernet, Fiber Channel media, or another sufficiently fast connection media. Wireless connection media may include, for example, a satellite link, a modem link through a cellular service, or a wireless link such as Wi-Fi.

In various embodiments, the multi-server networked environment 100 may employ any of a number of commercially available software products for continuous availability, such as, for example, various products available from VERITAS Software Corporation (Mountain View, Calif.). The software products for continuous availability may be installed and executed on servers 102 which are coupled to the network 120. In one embodiment, the software products for continuous availability may operate transparently to the servers 102 and/or applications 104. In various embodiments, the multi-server networked environment 100 may also employ any of a number of commercially available software products for storage management, such as, for example, various products available from VERITAS Software Corporation (Mountain View, Calif.). The storage management software may provide functionality such as cluster management, volume management, storage virtualization, and/or file system management to organize data on one or more storage devices 130 and/or provide storage access to servers 102 and clients 110.

In one embodiment, FIG. 1 may illustrate a Network-Attached Storage (NAS) environment. In a NAS environment, storage devices 130 may be directly attached to a network 120 (such as a local area network) using standard network protocols and may serve files to consumers on the network 120. In one embodiment, FIG. 1 may illustrate a Storage Area Network (SAN) environment. The SAN environment may comprise a dedicated storage network in which servers 102 and subsystems (e.g., switches) collaborate to manage the movement and storage of data on storage devices 130. The hardware (e.g., switches, hubs, bridges, routers, cables, etc.) that connects servers 102 to storage devices 130 in a SAN is referred to as a "disk fabric" or "fabric." In a SAN environment, clients 110 may send data to and receive data from the servers 102 over a local area network instead of communicating directly with the storage devices 130.

In order to capture the application state 103 at a point in time at or immediately prior to the point of failure, sufficient data about the application state 103 may be logged to enable deterministic restoration of the application state 103. FIG. 2 illustrates a multi-server networked environment 200 including the logging of application state data according to one embodiment. The application state 103C of a first instance 104C (e.g., on a first server 102C) may be restored to a second instance 104D (e.g., on a second server 102D) using data such as an application snapshot 132C, file system snapshot 133C, and/or log(s) 134C. The application snapshot 132C, file system snapshot 133C, and log(s) 134C may be stored on one or more storage devices (e.g., storage device 130B) which are accessible to both servers 102C, 102D.

The application snapshot 132C may comprise the execution state, memory state, transaction state, open network connections, open files, and other suitable state-related data for the application instance 104C at a particular point in time. The file system snapshot 133C may comprise contents and metadata of a file system used by the application instance 104C at a particular point in time. In one embodiment, snapshots of either type may be taken at a regular interval (e.g., once per minute). Further aspects regarding possible implementations of application snapshots are described in U.S. Pat. No. 6,848,106, which is incorporated herein by reference. Further aspects regarding possible implementations of file system snapshots are described in U.S. Pat. No. 6,850,945, which is incorporated herein by reference.

Because snapshots are too resource-intensive to be taken after every event that changes the application state 103C, one or more logs 134C may be used to store data between snapshots which alters the application state 103C. The log 134C may comprise any events that are capable of introducing non-determinism into program execution, including their original order and original results. For example, a log 134C may comprise a record of events and results such as transaction requests from clients 110B of the application, interprocess communication events, TCP/IP events, other file I/O, system calls for random number generation, system calls for a date or time, attempts to acquire semaphores, signal execution, etc. After restoring the state-related data in the application snapshot 132C and/or the file system data in the file system snapshot 133C, the entries in the log 134C may be "replayed" (i.e., encountered in the same order and with the same results as originally experienced) to deterministically restore the application state 103C and continue execution from the point of failure. The most recent snapshots 132C and/or 133C and the log 134C may be used to resume execution of an application 104, including the opening of connections to any clients 110B, from a point in time at or immediately prior to the point of failure. In this manner, the failover 105 from one server 102C to another server 102D may be transparent to any clients 110B.

To enable deterministic replay of the application, synchronization instructions 106C should be logged in the same order in which they were used. If the application uses library calls or calls to the kernel for such instructions (e.g., for semaphores), then the synchronization instructions may be detected and logged using conventional techniques (e.g., for monitoring the kernel). However, the application may perform such instructions internally or in-line, such that the instructions are invisible to the operating system (i.e., outside of kernel knowledge). For example, applications running in user mode may avoid calling the kernel for such instructions. As illustrated in FIG. 2 and discussed in greater detail below, preservation of the application state 103 may include the detection, interception, and/or capture of in-line synchronization instructions 106C.

Figure 3:
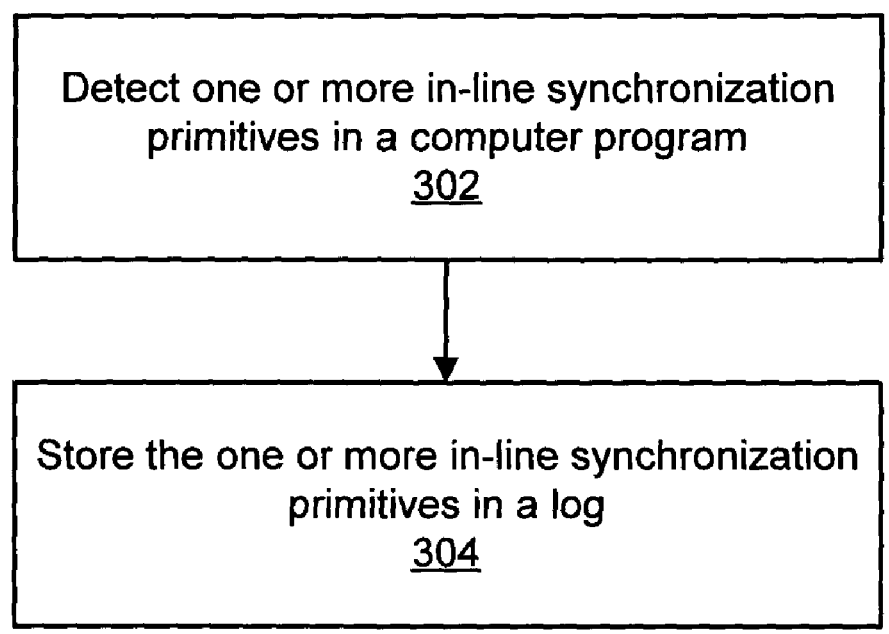
FIG. 3 is a flowchart illustrating a method for detecting and logging in-line synchronization primitives according to one embodiment.

FIG. 3 is a flowchart illustrating a method for detecting and logging in-line synchronization primitives according to one embodiment. In one embodiment, in-line synchronization instructions may comprise synchronization primitives which are executed atomically. Synchronization primitives may include atomic test-and-set instructions, atomic compare-and-swap instructions, atomic fetch-and-add instructions, and other suitable instructions for solving synchronization or concurrency problems. For example, synchronization primitives on a SPARC platform may include "ldstub," "ldstuba," "swap," "swapa," "casa," and "casxa" in one embodiment. In 302, one or more in-line synchronization primitives 106C are detected in a computer program 104. The in-line synchronization primitives 106C may be detected programmatically and automatically by use of computer-executable program instructions. In 304, the one or more in-line synchronization primitives 106C are stored in a log 134C in the same order and with the same results as originally encountered.

In one embodiment, dynamic binary compilation techniques may be used to detect, intercept, and/or capture the one or more in-line synchronization primitives in the computer program. Dynamic binary compilation is a technique used for generating program code at runtime. Dynamic binary compilation may also be referred to as "dynamic compilation."

FIG. 4 illustrates a multi-server networked environment 400 including detection, interception, and/or capture of in-line synchronization primitives using dynamic binary compilation according to one embodiment. The dynamic binary compilation may be implemented by a dynamic binary compiler 108 which generates and/or modifies executable program code for an application instance 104E at runtime. The dynamic binary compiler 108 may provide a full view of program code segments in a currently running application instance. The dynamic binary compiler 108 may then permit instructions in the program code to be analyzed, modified, and/or replaced as they are initially encountered at runtime. In one embodiment, the dynamic binary compiler may run against binary program code. In another embodiment, the dynamic binary compiler may run against program source code in a high-level programming language such as C or C++. In one embodiment, the dynamic binary compiler 108 may be employed without any prior modification of the program code of the application 104. The dynamic binary compiler 108 may be implemented primarily in software.

Figure 5:
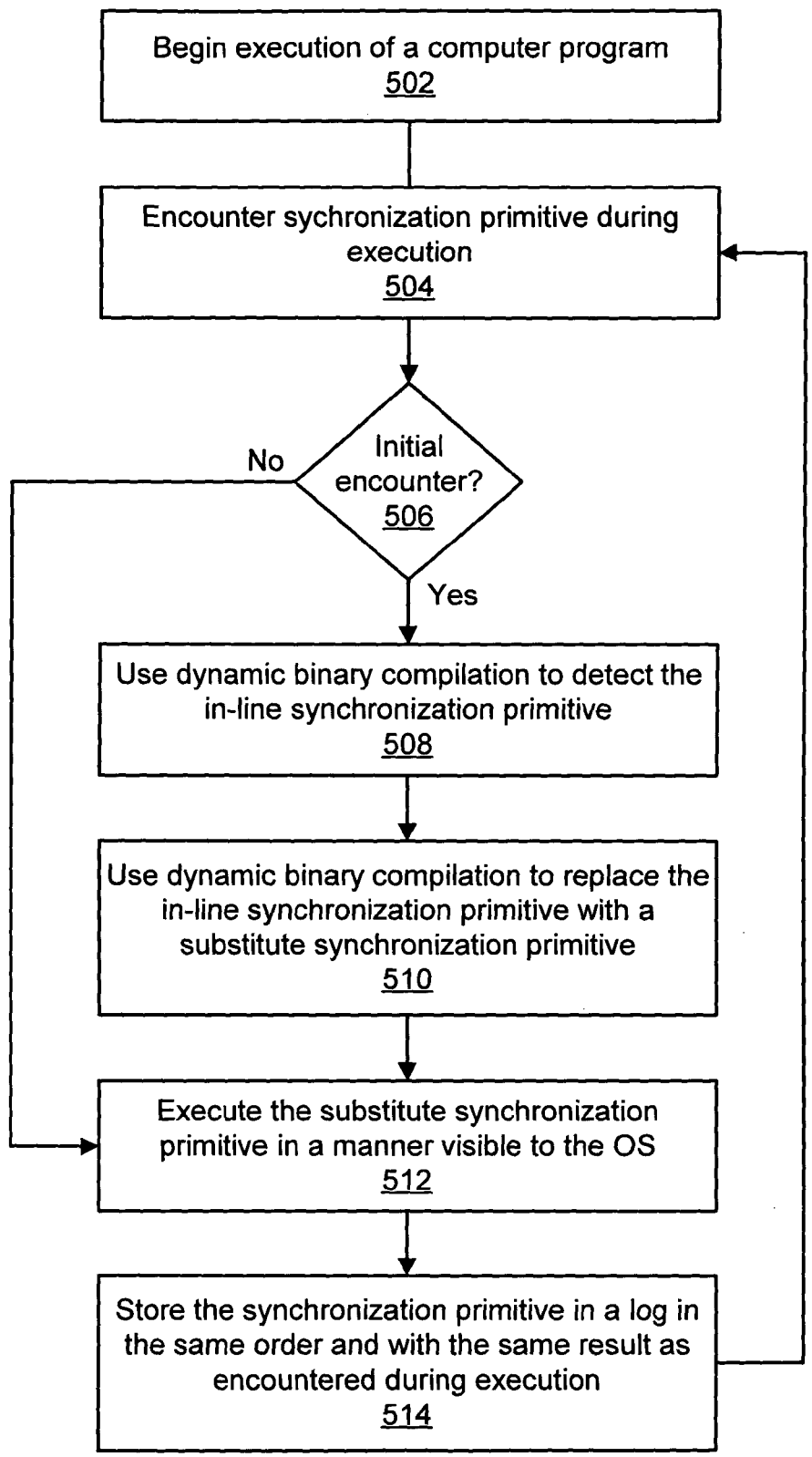
FIG. 5 is a flowchart illustrating a method for detecting and logging in-line synchronization primitives using dynamic binary compilation according to one embodiment.

FIG. 5 is a flowchart illustrating a method for detecting and logging in-line synchronization primitives using dynamic binary compilation according to one embodiment. In 502, execution of a computer program may begin. At this point, the dynamic binary compiler 108 may begin examining the program code instruction-by-instruction during execution. In 504, a synchronization primitive is encountered. If the current encounter is the first encounter of the particular instruction during execution (as determined in 506), then the dynamic binary compiler 108 detects the presence of the in-line synchronization primitive in the computer program code in 508. The in-line synchronization primitive may be detected by analyzing an instruction or sequence of instructions encountered in the program code and recognizing that the instruction or sequence of instructions includes one of the in-line synchronization primitives 106E. To enable the recognition, the dynamic binary compiler 108 may permit the differentiation of instructions (e.g., in-line synchronization primitives) from constants in the executing program code.

In 510, the dynamic binary compiler may modify the in-line synchronization primitive to permit its logging. The in-line synchronization primitive may be replaced by or redirected to a substitute synchronization primitive which is visible to the operating system (e.g., the kernel 107 or other core element of the operating system). In one embodiment, the dynamic binary compiler 108 may automatically substitute the in-line synchronization primitive with program code to switch the process into the kernel, where the substitute synchronization primitive may be executed. In one embodiment, the replacement code in the application program may comprise a trap, wherein control is transferred to the operating system (e.g., for execution of the substitute synchronization primitive) and then back to the application program. In 512, the substitute synchronization primitive is then executed in a manner which is visible to the operating system (OS), such as by executing the substitute synchronization primitive in kernel mode. Steps 510 and/or 512 may also be referred to as "intercepting" the in-line synchronization primitives. Steps 510 and/or 512 may also be referred to as "simulating" execution of the in-line synchronization primitives. The in-line synchronization primitives 106E shown in FIG. 4 may include both the original in-line synchronization primitives (i.e., the instructions prior to being detected) and the substitute synchronization primitives (i.e., the instructions after being detected and modified).

In 514, the substitute synchronization primitive is recognized by the operating system and stored in a log 134E. The synchronization primitive may be logged in the same order (with respect to other logged events) and with the same result as encountered during execution. In one embodiment, each synchronization primitive may be logged at substantially the same time at which it is encountered in the execution of the computer program. Each synchronization primitive may be logged each time it is encountered in the execution of the computer program. Storing or logging the synchronization primitive may also be referred to as "capturing" the synchronization primitive.

Execution of the computer program may continue after the logging in 514. Each in-line synchronization primitive encountered for the first time may be detected and intercepted using dynamic binary compilation as shown in steps 508 through 512. However, a subsequent encounter with the synchronization primitive may bypass steps 508 and 510 and quickly result in the execution and logging of the substitute synchronization primitive in 512 and 514.

In one embodiment, any performance penalty suffered due to dynamic binary compilation may be small. After each synchronization primitive is initially encountered in the program code, recognized, and replaced, the application instance 104E will typically run at substantially the same speed as an unmodified version of the same application.

Figure 6:
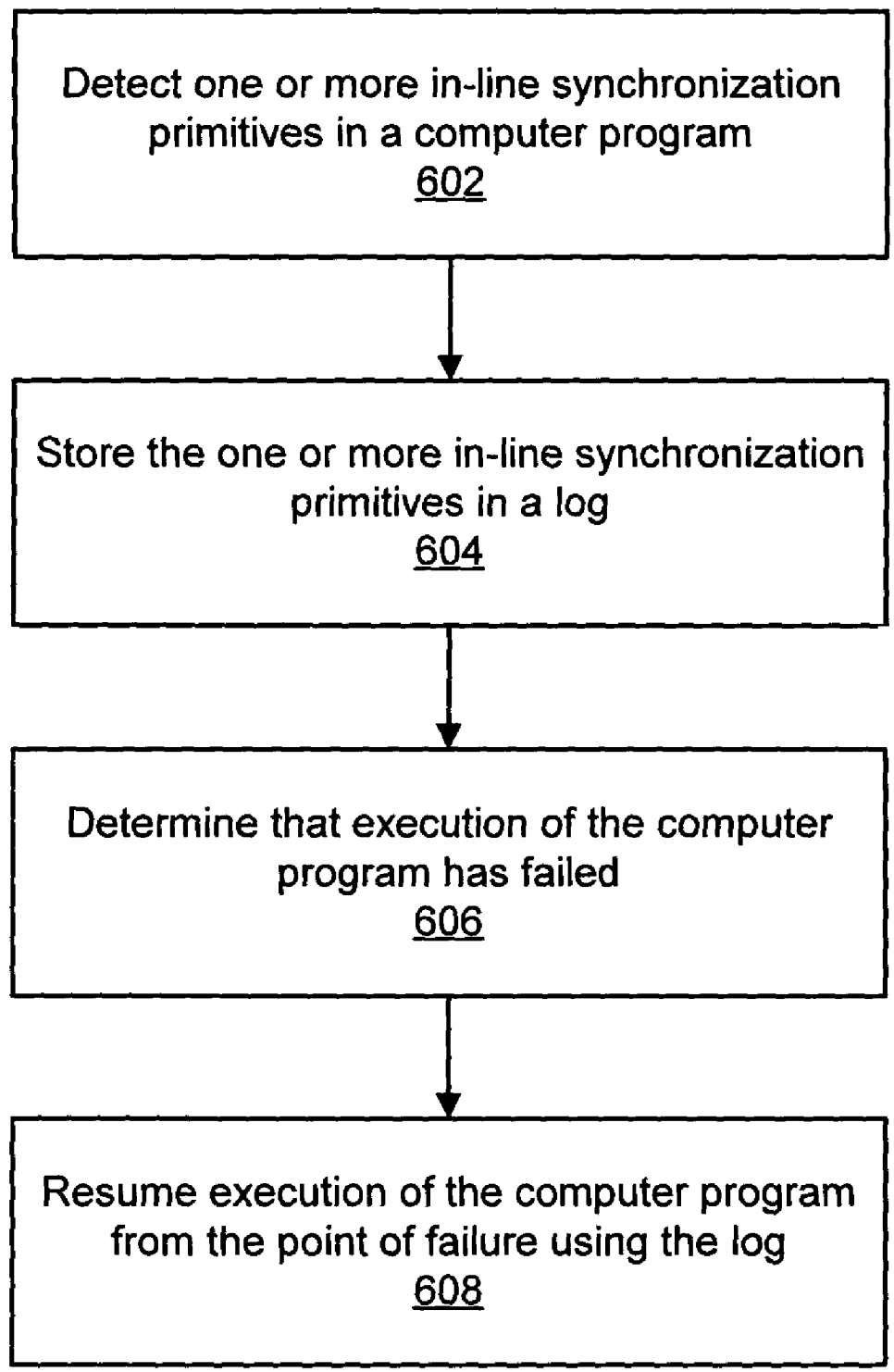
FIG. 6 is a flowchart illustrating a method for application failover based on the detection and logging of in-line synchronization primitives according to one embodiment.

In one embodiment, execution of the computer program may be deterministically replayed using the log 134E. FIG. 6 is a flowchart illustrating a method for application failover based on the detection and logging of in-line synchronization primitives according to one embodiment. In 602, one or more in-line synchronization primitives 106C are detected in a computer program 104E as discussed above with respect to FIGS. 2-5. The in-line synchronization primitives 106E may be detected programmatically and automatically by use of computer-executable program instructions, such as a dynamic binary compiler 108. In 604, the one or more in-line synchronization primitives 106E are stored in a log 134E as discussed above with respect to FIGS. 2-5.

In 606, it is determined that execution of the computer program 104E has failed on a server 102E at a particular point in time. Failure of the application instance 104E may be caused by a hardware or software fault in the server 102E itself or by a fault in an external entity such as a storage device. In one embodiment, the failure may be sensed automatically by another server 102F (e.g., using conventional cluster management techniques). The failure may also be sensed by another element such as a client 110C, a storage device 130C, or another computer system tasked with oversight of the multi-server networked environment 400.

In 608, the log 134E is used to resume execution of the computer program on another server 102F from the particular point in time. In one embodiment, the most recent valid application snapshot 132E and/or file system snapshot 133E may initially be restored. After restoring the snapshots 132E and/or 133E, entries in the log 134E may be replayed in the same order and with the same results as originally encountered to restore the application state 103E deterministically. The log 134E may comprise any events that are capable of introducing non-determinism into program execution along with the results of such events. For example, the log 134E may comprise a record of events and results such as transaction requests from clients 110C of the application, interprocess communication events, TCP/IP events, other file I/O, system calls for random number generation, system calls for a date or time, attempts to acquire semaphores, signal execution, etc. As discussed above, the log may comprise synchronization primitives 106E that were detected and logged in the proper order using dynamic binary compilation techniques. Replaying the synchronization primitives to restore the application state 103E may comprise executing or simulating execution of the primitives in the same order and with the same results as originally detected and logged. After restoring the snapshots 132E and/or 133E and the log 134E, including the opening of connections to any clients 110C, execution of the application 104 may continue from a point in time at or immediately prior to the point of failure. In this manner, the failover 105 from one server 102E to another server 102F may be transparent to any clients 110C.

In one embodiment, the application state 103E restored to the second server 102F may include the substitute synchronization primitives generated according to FIG. 5. The application snapshot 132E of the first application instance 104E may preserve the virtual memory relevant to the first instance 104E, including the substitute synchronization primitives. When the application snapshot is used to restore the virtual memory for the second instance 104F, the substitute synchronization primitives may be automatically restored without a need to detect and modify the original, in-line synchronization primitives a second time. In one embodiment, if all the in-line synchronization primitives 106E in the application 104E were not encountered prior to failure, the application state 103E restored to the second server 102F may include a combination of the substitute synchronization primitives that were previously inserted and the original, in-line synchronization primitives that were not yet encountered.

Exemplary Computer Systems

Figure 7:
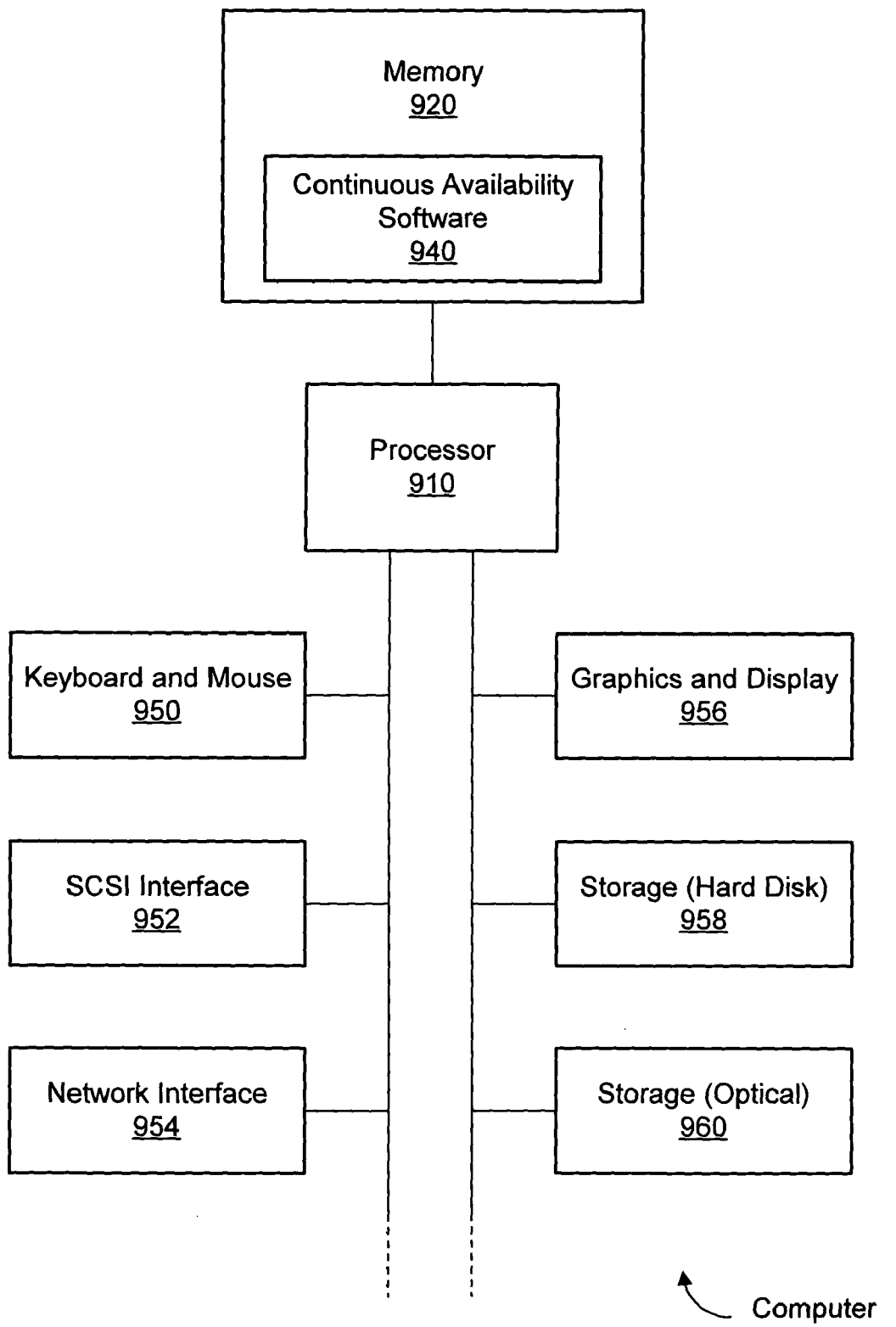
FIG. 7 illustrates a block diagram of a typical computer system for implementing embodiments of the systems and methods described above.

FIG. 7 illustrates a block diagram of a typical computer system 900 for implementing embodiments of the systems and methods described above for detection, interception, and/or capture of in-line synchronization primitives. Computer system 900 may be illustrative of a server 102, client 110, or storage device 130. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., continuous availability software 940. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the functions or methods described above. Also, in some embodiments software 940 can be provided to the computer system via a variety of computer-accessible media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computer systems with variations in, for example, the number of nodes, the type of operation of the computer system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
    programmatically detecting one or more in-line synchronization primitives in a computer program during execution of the computer program using dynamic binary compilation to detect the one or more in-line synchronization primitives in the computer program during the execution of the computer program;
    replacing each of the one or more in-line synchronization primitives in the computer program with a corresponding substitute synchronization primitive during execution of the computer program;
    executing at least one of the substitute synchronization primitives in a manner visible to an operating system;
    using the operating system to detect the execution of the at least one of the substitute synchronization primitives;
    storing information indicative of each of the detected substitute synchronization primitives in a log, wherein the information comprises an execution order of each of the detected substitute synchronization primitives and a result of each of the detected substitute synchronization primitives;
    determining that the execution of the computer program has failed at a point in time; and
    using the log to resume the execution of the computer program from the point in time by replaying the execution of the computer program in a manner that guarantees the execution order and the results of each of the detected substitute synchronization primitives as stored in the log.

2. The method of claim 1, further comprising:
    intercepting the one or more in-line synchronization primitives during the execution of the computer program using dynamic binary compilation.

3. The method of claim 1, wherein the one or more in-line synchronization primitives comprise atomic synchronization instructions which are invisible to an operating system.

4. A computer-accessible storage medium comprising program instructions, wherein the program instructions are computer executable to implement:
    detecting one or more in-line synchronization primitives in a computer program during execution of the computer program using dynamic binary compilation to detect the one or more in-line synchronization primitives in the computer program during the execution of the computer program;
    replacing each of the one or more in-line synchronization primitives in the computer program with a corresponding substitute synchronization primitive during execution of the computer program;
    executing at least one of the substitute synchronization primitives in a manner visible to an operating system;
    using the operating system to detect the execution of the at least one of the substitute synchronization primitives;
    storing information indicative of each of the detected substitute synchronization primitives in a log, wherein the information comprises an execution order of each of the detected substitute synchronization primitives and a result of each of the detected substitute synchronization primitives;
    determining that the execution of the computer program has failed at a point in time; and
    using the log to resume the execution of the computer program from the point in time by replaying the execution of the computer program in a manner that guarantees the execution order and the results of each of the detected substitute synchronization primitives as stored in the log.

5. The computer-accessible storage medium of claim 4, wherein the program instructions are further computer-executable to implement: intercepting the one or more in-line synchronization primitives during the execution of the computer program using dynamic binary compilation.

6. A system comprising:
    a storage device;
    a CPU; and
    a memory coupled to the CPU, wherein the memory stores program instructions which are executable by the CPU to:
        detect one or more in-line synchronization primitives in a computer program using dynamic binary compilation to detect the one or more in-line synchronization primitives in the computer program during execution of the computer program;
        replace each of the one or more in-line synchronization primitives in the computer program with a corresponding substitute synchronization primitive during execution of the computer program;
        execute at least one of the substitute synchronization primitives in a manner visible to an operating system;
        use the operating system to detect the execution of the at least one of the substitute synchronization primitives;
        store information indicative of each of the detected substitute synchronization primitives in a log on the storage device, wherein the information comprises an execution order of each of the detected substitute synchronization primitives and a result of each of the detected substitute synchronization primitives;
        determine that the execution of the computer program has failed at a point in time; and
        use the log to resume the execution of the computer program from the point in time by replaying the execution of the computer program in a manner that guarantees the execution order and the results of each of the detected substitute synchronization primitives as stored in the log.

7. The system of claim 6, wherein the program instructions are further executable by the CPU to: intercept the one or more in-line synchronization primitives during the execution of the computer program using dynamic binary compilation.

* * * * *